United States Patent [19]

Mushenski

[11] Patent Number: 4,568,995

[45] Date of Patent: Feb. 4, 1986

[54] ELECTROMAGNETIC INTERFERENCE SUPPRESSION IN A VEHICLE HORN CIRCUIT

[75] Inventor: Christopher B. Mushenski, Mount Clemens, Mich.

[73] Assignee: The United States of America as represented by the Secretary of the Army, Washington, D.C.

[21] Appl. No.: 133,173

[22] Filed: Mar. 24, 1980

[51] Int. Cl.[4] .............................................. H02H 9/04
[52] U.S. Cl. .......................................... 361/2; 361/13; 310/221
[58] Field of Search ...................... 361/2, 13; 310/221, 310/220, 249, 68 C

[56] References Cited

U.S. PATENT DOCUMENTS

| | | | |
|---|---|---|---|
| 2,708,723 | 5/1955 | Staak | 310/220 X |
| 3,322,988 | 5/1967 | Ishikawa et al. | 310/220 |
| 3,532,962 | 10/1970 | Balcke et al. | 310/68 C X |

*Primary Examiner*—Patrick R. Salce
*Attorney, Agent, or Firm*—Peter A. Taucher; John E. McRae; Robert P. Gibson

[57] ABSTRACT

In a military vehicle having an electric horn actuator circuit, the improvement comprising the addition of a capacitor in the circuit at a location between a brush and contact ring assembly disposed within the vehicle steering column. The capacitor is electrically located in close connection to the brush-contact ring interface to respond effectively to voltage/current surges initiated at the brush-contact ring interface. The capacitor can be installed in existing vehicles in a retrofit operation.

1 Claim, 1 Drawing Figure

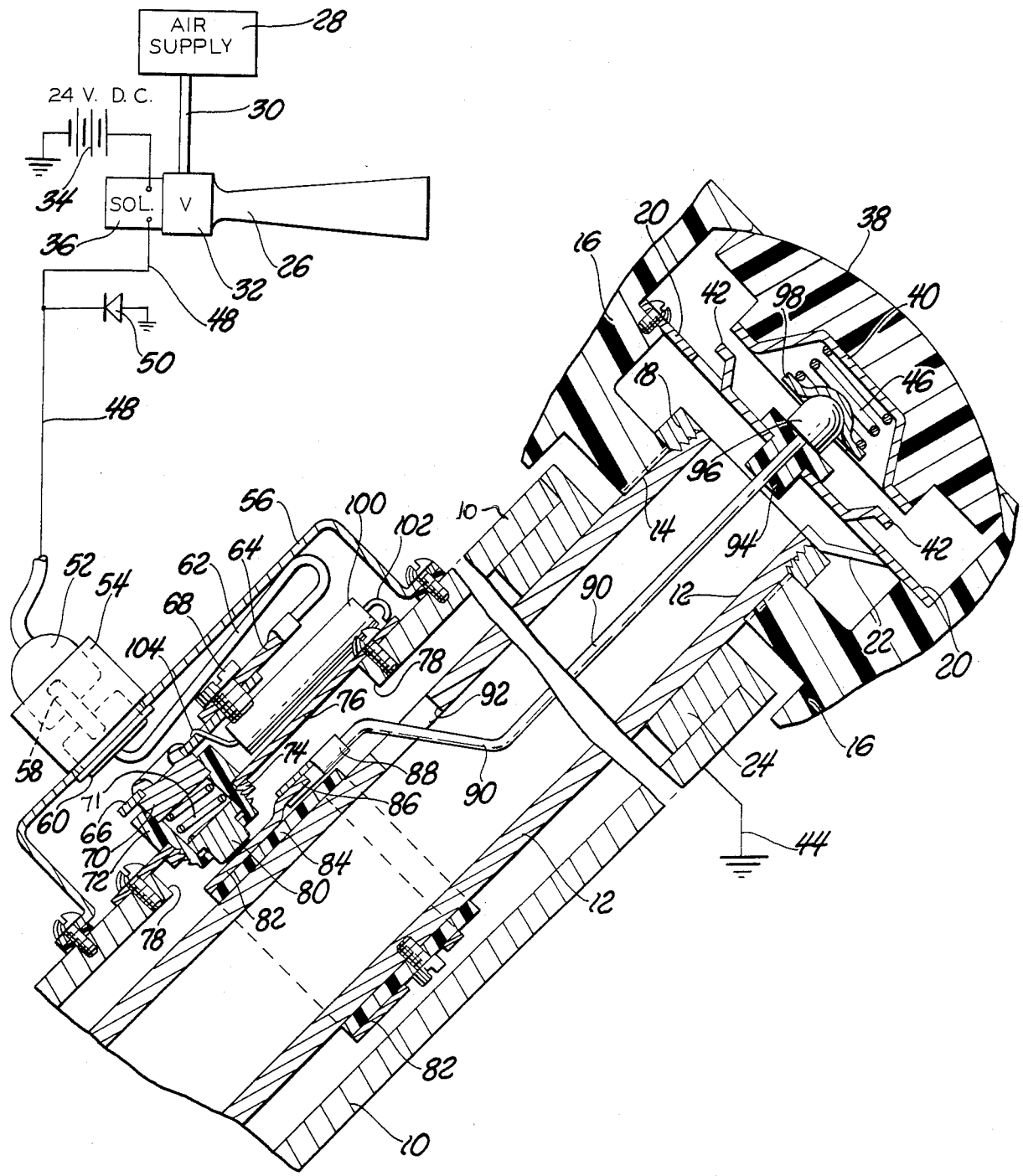

ELECTROMAGNETIC INTERFERENCE SUPPRESSION IN A VEHICLE HORN CIRCUIT

BACKGROUND AND SUMMARY OF THE INVENTION

The present invention is directed to mechanism for suppressing an arcing condition across a brush-contact ring assembly in a vehicle horn-actuating circuit. By thus suppressing the arcing condition it is possible to suppress electromagnetic interference that would disturb or interfere with radio reception in the same vehicle or other vehicles in the immediate vicinity. The invention is partly concerned with the incorporation of a conventional capacitor into the horn circuit without changing, destroying, or modifying the existing electric components or their mounting mechanisms. The invention is especially intended as an add-on or retrofit device usable in a range of existing military vehicles without extensive cost to remove or replace components.

THE DRAWINGS

The single FIGURE illustrates a conventional vehicle horn circuit adapted to utilize my invention.

In the drawing there is fragmentarily shown a hollow stationary upright steering column 10 for a military vehicle. Concentrically disposed within hollow column 10 is a conventional rotary tubular steering shaft 12 having a splined connection 14 at its upper end for a steering wheel 16, only part of which is shown in the drawing. A nut 18 is threaded onto shaft 12 for securement purposes. Within steering wheel 16 there is mounted a metallic contact plate 20 have a spring arm extension 22 engaged with shaft 12 to provide a ground connection through the shaft to a conventional shaft bearing 24 and steering column 10.

The upper left corner of the drawing shows a conventional air-actuated vehicle horn 26 connected to an air supply 28 via a conduit 30 and valve 32. The valve is opened when current from a voltage source 34 is passed through the conventional solenoid actuator 36 of the valve. The actuator circuit for solenoid 36 includes an electrical brush structure comprised of a plug 70, spring 71 and plug 80. The brush structure is mounted within steering column 10 to engage a contact ring 82 carried by steering shaft 12. Cable 90 extends from ring 82 upwardly through the steering shaft to a disengageable connection with a contactor 40 carried by manual bottom 38 on steering wheel 16. Depression of button 38 causes contactor cup 40 to engage fingers 42 on contact plate 20, thereby completing a solenoid 36-actuator circuit through steering shaft 12 and ground connection 44. When the manual force on button 38 is removed a coil spring 46 restores button 38 to its illustrated position, thereby interrupting the connection between metallic cup 40 and contact plate 20, thus opening the electric circuit to close valve 32 and de-actuate horn 26.

Conductor 48 terminates in a female socket connection 52 with an electric receptacle 54 that is mounted on a removable cover 56 for the aforementioned brush structure. Receptacle 54 includes an internal pin 58 adapted to electrically connect with the plug section 60 of a flexible insulated electric lead 62, said lead having a bifurcated termination 64 adapted to be clamped onto metallic plate-type terminal 66 by means of a screw 68. Terminal 66 is riveted to metallic plug 70 which is press fit or otherwise secured within a dielectric housing 72. A nut 74 secures housing 72 to a metallic face plate 76 that overlies a rectangular access opening 78 in steering column 10. Plate 76 can be removed from the steering column after first removing cover 56.

The aforementioned plug 70 is engaged with a coil compression spring 71 whose other end engages a second metallic plug 80, so that the outer end surface of plug 80 continually engages a metallic contact ring or sleeve 82 surrounding the steering shaft 12. The ring is carried on a dielectric liner 84 that insulates the ring from shaft 12. During vehicle turning maneuvers the driver of the vehicle operates steering wheel 16 to rotate shaft 12; contact ring 82 rotates with the shaft but continues to electrically engage the stationary metallic plug 80. The two plugs 70 and 80 and the intervening coil spring constitute an electrical brush tht forms an electrical connection between terminal 66 and the rotary contact ring 82.

Contact ring 82 is upset to provide a tab-like finger 86 adapted to receive the slip-on end connector 88 for a flexible insulated cable 90 that extends through an enlarged opening 92 in shaft 12. The cable extends upwardly along shaft 12 and through a tubular insulator 94; the upper extremity of the cable is formed as a spherical head 96 engaged with a metallic cap 98, said cap engaging one end of the aforementioned coil spring 46.

From the above discussion it will be seen that solenoid 36 is actuated via an electric circuit that includes a series of connected electrical devices, including line 48, pin 58, flexible lead wire 62, plate-type terminal 66, brush elements 70 and 80 and the intervening coil spring, contact ring 82, connector 88, cable 90, head 96, cap 98, spring 46, cup 40, fingers 42 and contact plate 20, spring arm 22, shaft 12, bearing 24, and steering column 10. Actuation of horn 26 is accomplished by manual depression of button 38 to complete the electric circuit across elements 40 and 42, as previously described.

I have discovered that an electric arc can be produced at the interface between brush element 80 and the contact ring 82, depending on manufacturing procedures or tolerances, and surface wear of components associated with rotary shaft 12. My invention is directed to the employment of a capacitor 100 within the space circumscribed by cover 56 for the purpose of suppressing the arcing condition at the brush 80-contact ring 82 interface. The capacitor is provided with two wire leads 102 and 104 having soldered connections, respectively, with face plate 76 and plate-type terminal 66. The surge of current and voltage associated with a transient electric arc at the end surface of brush element 80 is directed from plate 66 through lead 104 into capacitor 100, thus momentarily being shorted by the AC characteristics of the capacitor 100 through lead 102, plate 76 and steering column 10 to ground connection 44. I have found that the undesired arcing condition association with a 24 volt electrical system in a military vehicle can be suppressed with a capacitor 100 rated at approximately 0.47 $\mu f$ @ 200 volts DC. The capacitor used was of a nonpolarized, non-electrolytic construction.

It should be noted that the structure shown in the drawing is conventional except for capacitor 100 and its lead wires 102 and 104. The lead wires are soldered to the face plate 76 and existing terminal 66 so that the capacitor is physically made a part of the face plate-brush assembly. This is advantageous in enabling the capacitor to be added to the horn actuator circuit of an existing vehicle, either by soldering the lead wires 102 and 104 to an existing face plate-brush assembly already used in the vehicle, or by substituting a modified plate-brush assembly for the existing face plate-brush assembly in the vehicle. The capacitor can be physically mounted on face plate 76 at a military depot or other manufacturing facility remote from the vehicle in which it is to be installed.

Capacitor 100 is a relatively low cost device that can be incorporated into existing vehicles without modifying any of the existing structures, such as plate 76 or terminal 66. The capacitor 100 is electrically located in close proximity to the source of the objectional arcing for achievement of the necessary arc suppressor action. The diode 50, connected to line 48, tends to clip pulses of high voltage associated with objectional arcing; however in experiments with military vehicles the diode alone was not effective to fully suppress the arcing condition. I found it necessary to add the capacitor 100 in the location shown in the drawing before it was possible to fully suppress the arc.

I wish it to be understood that I do not desire to be limited to the exact details of construction shown and described for obvious modifications will occur to a person skilled in the art.

I claim:

1. In a military vehicle equipped with a hollow stationary upright steering column, a rotary steering shaft within the steering column, a steering wheel secured to the upper end of the shaft, an insulated contact ring mounted on the steering shaft at a point remote from the steering wheel, an insulated electric cable extending from the contact ring into the shaft and thence along said shaft into the steering wheel, a grounded contact plate within the steering wheel, a depressible horn-actuator button flotably positioned within the steering wheel, said button being effective to provide a ground connection between the cable and the contact plate when the button is subjected to external manual actuating pressure, an electric horn-actuating mechanism remote from the steering column, said column having an access opening in registry with the aforementioned contact ring on the shaft, a removable metallic face plate secured to the column in overlying relation to the access opening, a dielectric housing extending outwardly from said face plate, a metallic brush assembly mounted within the dielectric housing with opposite ends thereof presented to the contact ring and the space outboard from the dielectric housing, a plate-type terminal carried by the outer end of the brush assembly, a cover overlying the aforementioned face plate and brush assembly, said cover having an externally-accessible electrical receptacle, an internal flexible electrical lead connectable between the plate-type terminal and the receptacle, and external electric circuitry between the horn-actuating mechanism and aforementioned receptacle; the improvement comprising a capacitor electrically connected between the plate-type terminal and face plate to suppress electric arcing between the brush and contact ring, thereby suppressing electromagnetic interference that such arcing might introduce into other electrical equipment in the vicinity of the vehicle; said capacitor consisting of an elongated cylindrical capacitor disposed in the space between the plate-type terminal and face plate with the axis of the cylindrical capacitor extending parallel to the plates; said capacitor having a first lead wire solder-connected to the plate-type terminal, and a second lead wire solder-connected to the aforementioned face plate; said capacitor being a nonpolarized, nonelectrolytic capacitor rated at approximately 0.47 $\mu f$ @ 200 volts D.C.

* * * * *